United States Patent [19]

Mak et al.

[11] Patent Number: 4,914,418
[45] Date of Patent: Apr. 3, 1990

[54] OUTBOUND DETECTOR SYSTEM AND METHOD

[75] Inventors: Sioe T. Mak, Chesterfield; David S. Takach, Brentwood, both of Mo.; Ray C. Hatton, Jr., Columbus, Ind.

[73] Assignee: Emerson Electric Co., St. Louis, Mo.

[21] Appl. No.: 293,181

[22] Filed: Jan. 3, 1989

[51] Int. Cl.$^4$ .................. H04M 11/04; H04J 1/12
[52] U.S. Cl. .................. 340/310 A; 340/310 R; 358/138; 358/166; 370/6; 375/76; 375/99; 375/104
[58] Field of Search ........ 340/310 R, 310 A, 310 CP; 375/76, 99, 104; 358/138, 166; 370/6

[56] References Cited

U.S. PATENT DOCUMENTS

| | | | |
|---|---|---|---|
| 4,400,688 | 8/1983 | Johnston et al. | 340/310 R |
| 4,420,769 | 12/1983 | Novak | 358/139 |
| 4,568,912 | 2/1986 | Kitamura et al. | 358/138 |
| 4,642,637 | 2/1987 | Baer | 340/310 R |
| 4,654,862 | 3/1987 | Camborde et al. | 375/76 |
| 4,729,025 | 3/1988 | Yanase | 358/166 |

*Primary Examiner*—Donnie L. Crosland
*Attorney, Agent, or Firm*—Polster, Polster and Lucchesi

[57] ABSTRACT

Outbound signals carried over an electric power network are detected and crosstalk is rejected by sampling the waveform in three segments of each cycle. In the first segment valid signals are always absent. Valid signals appear at the same time in both the second and third segments. Sample waveform values from alternate half cycles are compared to detect differences indicative of outbound signal information. The energy in each of the three segments is compared with an energy threshold for that segment and a cycle under test is rejected when the energy in the first segment exceeds the threshold for that first segment. A cycle under test is also rejected if the energy in the third segment greatly exceeds the energy in the second segment. Signal detection thresholds for both signal strength and energy in the segments are set recursively using actual samples acquired at the outbound detection site. These thresholds are sensitive to dynamic network changes.

30 Claims, 6 Drawing Sheets

OUTBOUND DETECTOR SYSTEM AND METHOD

BACKGROUND OF THE INVENTION

This invention relates to carrier wave intelligence systems in general and, more particularly, to apparatus useful in detecting and extracting information or intelligence transmitted outbound to electricity meters and the like over electric power distribution networks from a central site.

The use of electric power lines for meter reading, load control, and other communications purposes is well known in the art. It is known that a modulation voltage can be superimposed on a power system voltage to cause wave shape perturbations in the carrier wave. In the embodiment described hereinafter, the carrier wave is the voltage wave of an electrical power distribution system or network. See Johnston et al U.S. Pat. Nos. 4,106,007, 4,218,655, and 4,400,688, and Stratton et al U.S. Pat. No. 4,105,897, which patents are incorporated herein by reference.

Communication over an electric distribution network is a complex undertaking. Each customer service constitutes a branch in the distribution feeder, and the branching is so extensive that it is impractical to provide filter and by-pass circuitry at each branch point. The distribution network is not an attractive medium for conventional communications due to the attenuation and dispersion of the signals and because noise levels tend to be high. To overcome the high noise levels, it is generally necessary to use narrow band filtering, error-detecting and error-correcting codes, and relatively high signal power levels at low bit rates.

The aforementioned problems arise in two areas. The first, to which the present invention relates, concerns transmitting information from the central source in the direction of energy flow to the individual customer premises. This transmission of information in the direction of energy flow is referred to as "outbound" signaling. Information flow in the opposite direction, from customer to central site, is called "in-bound" signaling.

For "outbound" signaling, in order to reach line-to-line customers on the three-phase distribution network of a utility, for example, the modulation signal which carries the information preferably should have dominant positive and negative sequence components. This implies that the outbound modulation signal should not appear on all three phases simultaneously at equal strength and phase relationship.

At least one outbound signal detector system looks for signals disposed on the voltage carrier at the $-10°$ and the $+30°$ points on the waveform. A fixed signal threshold is typically used with that system to determine the presence or absence of signal at the detection points. This system has shown good performance under various conditions, but it could be improved.

At least one area of possible improvement concerns coping with the dynamics of the distribution network. For example, outbound signaling causes transient oscillations in the waveform which depend on the capacitance and load on the network at that time. Variation in loads results in a great variation in these transients, with resulting distortion of the waveform. Since loads on power distribution networks vary with time of day, this means that the reliability of the outbound signal detector can also vary with the time of day.

A second possible area of improvement relates to crosstalk. In any three-phase system (which power distribution networks typically are), the voltage in any one phase is related to or coupled to the voltages in the other two phases. This leads to crosstalk. It should also be realized that the source configuration of the power distribution network also affects the severity of crosstalk.

A study of various source configurations reveals that the outbound signal around the voltage zero crossing changes in magnitude and frequency with respect to the zero crossing and depends on network loading. Moreover, during certain loading conditions crosstalk may be severe or less severe, creating difficulties in signal detection and identification. It has also been found that one type of crosstalk is due to the trailing end of the oscillatory signal wave.

It should be appreciated that the difficulty of detecting the outbound signal is further complicated by the fact that such detection normally takes place at a remote location (such as the electricity meter for a user) which has only limited space available. Moreover, for such detectors to be widely used they must be relatively low in cost.

SUMMARY OF THE INVENTION

Among the various objects and features of the present invention may be noted the provision of an outbound signal detection system capable of extracting the outbound signal under various dynamic load conditions.

Another object is the provision of such a system capable of rejecting crosstalk under various dynamic load conditions.

A third object is the provision of such a system which is relatively simple and inexpensive in construction.

A fourth object is the provision of such a system which adapts to the dynamics of the power distribution network.

A fifth object is the provision of such a system which has an adaptive threshold for noise rejection.

Other objects and features will be in part apparent and in part pointed out hereinafter.

Briefly, apparatus of the present invention for detecting outbound signals carried by cyclic waveforms over an electric power distribution network includes circuitry for rectifying cyclic waveforms transmitted from a central site to create a rectified cyclic waveform of successive half cycles. Other circuitry samples the rectified waveform to obtain sample waveform values. The sampling occurs in three segments of each cycle of the waveform. The first segment is a region of the cycle in which valid signals are always absent, the second segment is a region of the cycle in which valid signals appear, and the third segment, which is distinct from the second segment, is a region in which valid signals also appear. Circuitry then detects the presence of outbound signal information as a function of the sample waveform values in the three segments.

In a second aspect of the present invention, apparatus for detecting outbound signals carried by cyclic waveforms over an electric power distribution network includes circuitry for rectifying cyclic waveforms transmitted from a central site to create a rectified cyclic waveform of successive half cycles. Sampling circuitry samples the rectified waveform to obtain sample waveform values, and then circuitry compares sample waveform values from alternate half cycles of the rectified waveform to detect differences indicative of outbound signal information.

A method of the present invention for rejecting crosstalk in outbound information flow along a multi-phase electric distribution network includes the step of, for at least one phase of a multi-phase electric distribution network, dividing a cyclic waveform associated with that phase into at least three segments per cycle. The first of the three segments is selected such that outbound information is absent from the first segment unless crosstalk has occurred. The second of the segments is selected such that outbound information appears in the second segment. And the third of the segments is selected such that outbound information also appears in the third segment. The energy in each segment is compared with an energy threshold for that segment and a cycle under test is rejected for the presence of signal when the energy in the first segment exceeds the threshold for the first segment.

A method of the present invention for detecting outbound information carried by cyclic waveforms over an electric power distribution network includes the step of sampling a cyclic waveform originating at a central site to obtain a plurality of samples for each cycle of the waveform. At least some of the samples have a first expected value in the absence of an outbound signal and have a second expected value in the presence of an outbound signal on the waveform. A signal detection threshold is set from a predetermined number, N, of samples taken. The signal detection threshold is modified if the value of the (N+1)st sample exceeds a predetermined fraction of the previously set signal detection threshold.

A method of the present invention for detecting outbound information in a multi-phase electric distribution network includes the step of deriving a waveform from the voltage on at least one phase of a multi-phase electric distribution network, which derived waveform includes at least a cyclic carrier component. Cycles of the waveform are partitioned into at least three segments per cycle. The first of the segments is before a valid signal would appear on the waveform, the second is in the area where a valid signal could appear but before a zero crossing of the waveform, and the third is in an area where a valid signal could appear but after a zero crossing of the waveform. The energy in at least the first segment is compared with an energy threshold for that segment. The presence of a signal in the cycle under test is identified only if the energy in the first segment falls below the threshold for that segment and the energy in the second and third segments is indicative of the presence of a signal in that cycle.

BRIEF DESCRIPTION OF THE DRAWINGS

In the drawings.

Similar reference characters indicate similar parts throughout the several views of the drawings.

DESCRIPTION OF THE PREFERRED EMBODIMENT

Figure 1A:
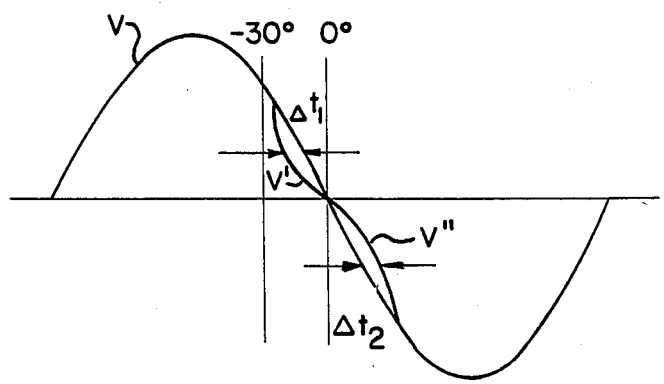
FIGS. 1A–1C are diagrams representing modulated voltages appearing on an electric power distribution network during various conditions.
Figure 1B:
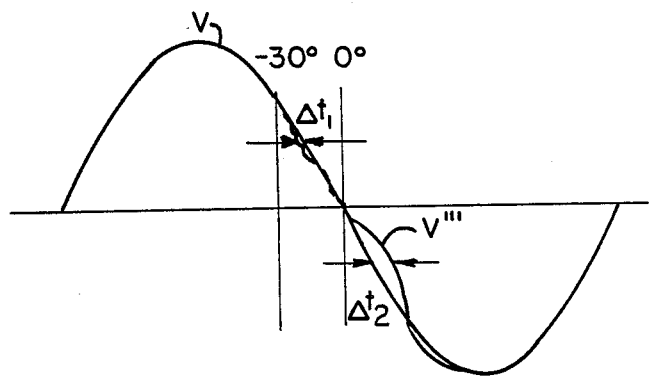
Figure 1C:
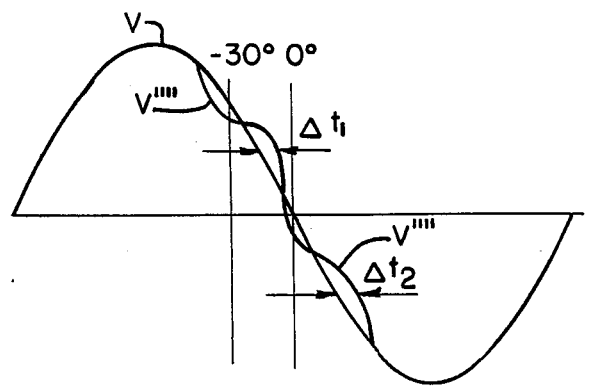

The present invention can best be understood by examining some typical waveforms encountered in outbound signal detection, such as those waveforms shown in FIG. 1A–1C. To simplify the analysis, assume that the signal starts at an angle less than thirty (30) degrees before the voltage zero crossing and that the energy contained in the signal is larger than the noise energy. The first assumption is easily controlled at the source while the second is a minimal requirement for signal detection in any event.

Consider the situation illustrated by the waveform of FIG. 1A. In this figure, the waveform V represents the power system voltage transmitted from the central source throughout the distribution network. This waveform is modulated by a legitimate signal resulting in time differences delta-$t_1$ and delta-$t_2$ between the carrier waveform V and the modulated portions of the waveform V' and V". Note that modulated portion V' occurs between thirty (30) degrees before the zero crossing and the zero crossing itself, while portion V" occurs after the zero crossing. This signal is detected by searching for the maximum values of delta-$t_1$ and delta-$t_2$. The signal is defined as the sum of delta-$t_1$ and delta-$t_2$.

FIG. 1B illustrates the situation in which the waveform V is modulated by crosstalk appearing after the zero crossing to generate a modulated waveform V'''. In this situation delta-$t_1$ is due solely to noise and delta-$t_2$ is due to crosstalk. Using the detection scheme described above in connection with FIG. 1B, signal is (falsely) detected if delta-$t_2$ is large even when delta-$t_1$ is extremely small.

In FIG. 1C the modulated waveform V'''' is a result of crosstalk due to a signal starting at a point more than thirty (30) degrees before the zero crossing. In this situation the sum of delta-$t_1$ and delta-$t_2$ can be positive, negative or zero and hence, under certain conditions, interpreted as signal.

Figure 2:
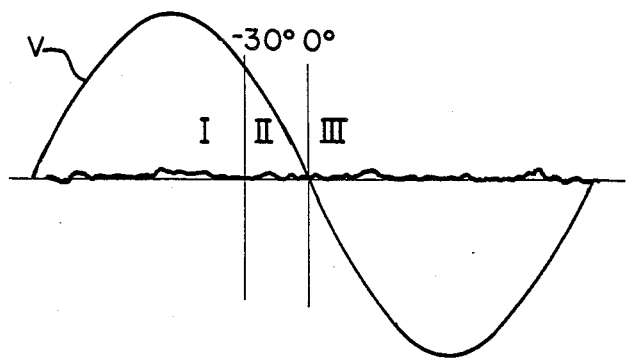
FIG. 2 is a diagram similar to those of FIGS. 1A–1C illustrating the noise energy present in an unmodulated voltage waveform.

The present invention detects the presence of signal and rejects crosstalk by examining the energy in the voltage waveform of the distribution network and more particularly by examining the energy in each cycle of that voltage waveform. In FIG. 2, for example, the energy resulting from only noise (i.e., no signal or crosstalk present) is illustrated. The waveform is again divided into three segments, labelled I, II, and III. Segment I is that portion of the waveform from the negative-to-positive transition of the waveform up to thirty degrees before the positive-to-negative transition of the same cycle ($-30°$). Segment II follows segment I and continues to the zero degree point of the waveform (i.e., the positive-to-negative transition or 0°). Segment III follows segment II and continues to the following negative-to-positive transition of the waveform.

When no signal or crosstalk is present (FIG. 2), the energy in all three segments is relatively low. The threshold for detection must be set so that the energy representative only of noise does not falsely result in the indication of a signal.

Figure 3:
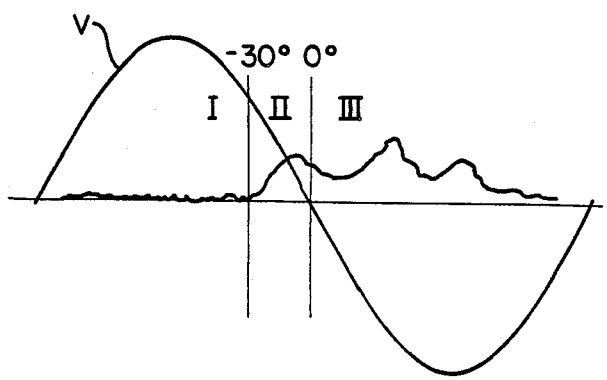
FIG. 3 is a diagram similar to FIG. 2 illustrating the energy present in an voltage waveform modulated by a signal.

The energy for the noise-only situation (FIG. 2) should be contrasted with that for a legitimate signal (FIG. 3). In the case of a legitimate signal, the energy detected will most often be negligible (i.e., below the threshold) in segment I. Appreciable energy, however, will be present in both segments II and III.

Figure 4:
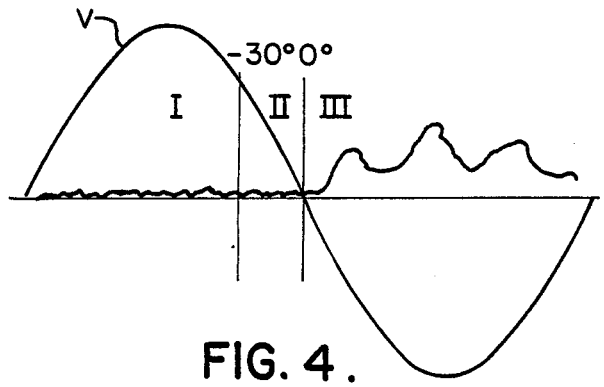
FIG. 4 is a diagram similar to FIG. 3 illustrating the energy present in an voltage waveform where crosstalk is present in the latter portion of the waveform.

The energy pattern for the situation of FIG. 1B (crosstalk first appearing after the zero degree point on the waveform) is illustrated in FIG. 4. In that case, the energy in both segments I and II is below the threshold, but in segment III the energy is considerably above the threshold. Note that if a simple detection scheme of comparing the total energy in segments II and III to a threshold is used, the situation of FIG. 4 can easily result in the false detection of a signal.

Figure 5:
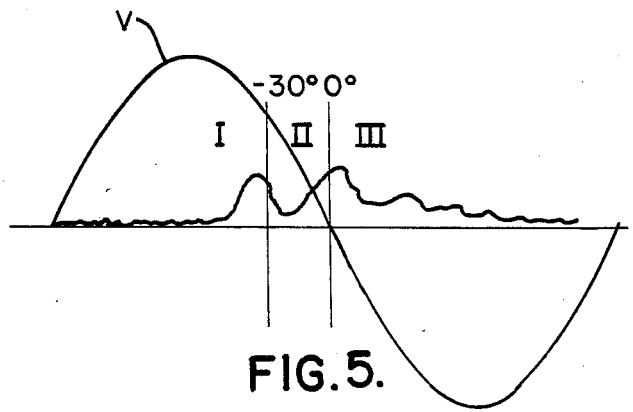
FIG. 5 is a diagram similar to FIG. 4 illustrating the energy present in an voltage waveform where crosstalk is present starting at a relatively early portion of the waveform.

Similarly, FIG. 5 illustrates the energy pattern correspond to the situation of FIG. 1C (crosstalk starting before the $-30°$ point of the waveform). In this situation, there is appreciable energy in all three segments. Note that if the detector used does not examine the energy in segment I, but only the energies in segments II and III, the situation of FIG. 5 can be indistinguishable from that of FIG. 3 (the signal present situation).

By extending the range of detection beyond the $-30°$ point and measuring the power in all three segments independently, however, the following detection scheme can be used:

|  | Segment I Energy Level | Segment II Energy Level | Segment III Energy Level | Result |
|---|---|---|---|---|
| FIG. 2 | Low | Low | Low | Threshold |
| FIG. 3 | Low | High | High | Pass |
| FIG. 4 | Low | Low | High | Reject |
| FIG. 5 | High | High | High | Reject |

Sampling in steps of 5° to 6° using the above detection scheme provides quite acceptable results, while even sampling in steps of 8° and 12° provides surprisingly good results.

In measuring the energy for energy filtering, one can measure either voltage differences or time differences. When squared, either set of differences can represent the energy. It is preferred, however, that the time differences be used, since at points removed from the zero crossing of the voltage the time differences are enhanced significantly. Particularly at remote points at which the crosstalk energy is large compared to the noise energy, the square of the time differences is a better measure of the energy than the square of the voltage differences.

No matter which differences are used, it is preferred that the acquisition scheme use a plurality of points. For example, using time differences a comparison is made of incremental time differences between alternate half-cycles of the voltage waveform. Using voltage differences, a comparison is made of sampled voltage magnitudes captured at specified time intervals between alternate half-cycles of the voltage waveform.

In either case, the potential presence of the signal is deduced from an examination of the residual differences resulting from the comparison operation. Under ideal circumstances, examination of the residual comparison values alone can detect the presence of signal. However, noise and crosstalk effects require further processing of those residuals to detect the presence of a valid signal.

Comparison of incremental time differences is used as an example in the following description, although the present invention is not limited to the use of time differences.

Figure 6:
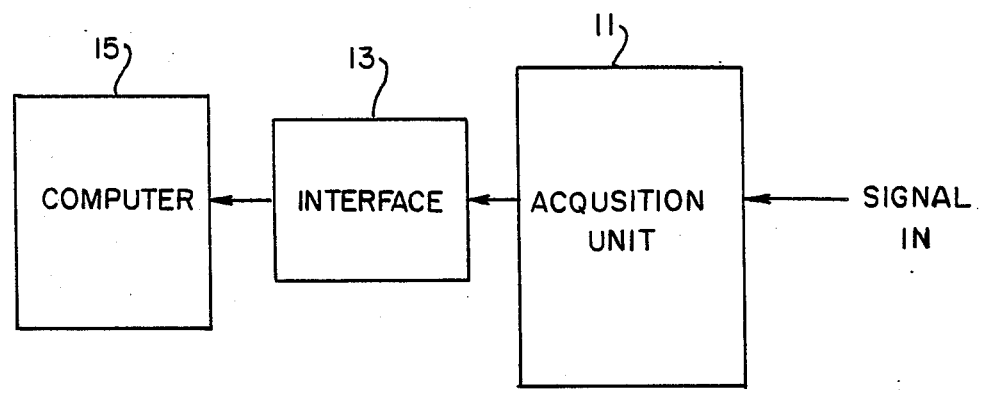
FIG. 6 is a block diagram illustrating the signal detection and extraction apparatus of the present invention.

A multipoint signal acquisition scheme is implemented in the system of FIG. 6. This system includes an acquisition unit 11 for acquiring the signal (and noise) from the carrier, an interface 13 for taking the output of the acquisition unit and making it compatible with the requirements of a computer 15 which analyzes the output. The only requirements for computer 15 are that it be small enough to be used at the detecting site (such as an electricity meter), that it have a relatively minimal amount of memory, and that its speed be sufficiently fast to process the data within a few cycles of when it is acquired. Since the speed of outbound communications systems using electric power distribution networks are relatively slow, this last requirement is not particularly rigorous.

In the multipoint signal acquisition scheme of the present invention, predetermined voltage levels are set and instantaneous values of the rectified line voltage are compared to those predetermined voltage levels. As the instantaneous line voltage crosses a predetermined voltage level, the time $t_1$ associated with that crossing is recorded, the next predetermined voltage level is set, and the process is repeated.

Figure 7:
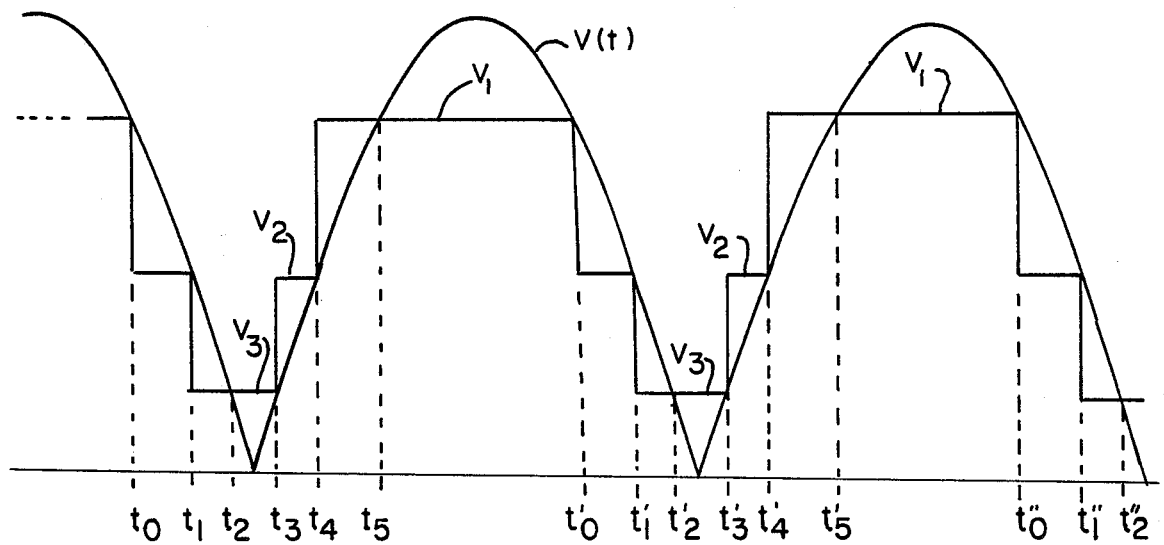
FIG. 7 is a diagram illustrating the predetermined voltage values at which the invention of FIG. 6 records times indicating the modulation of the waveform.

FIG. 7, for example, illustrates a scheme using three predetermined voltage levels $V_1$, $V_2$, and $V_3$. As the rectified instantaneous line voltage, labelled v(t) in FIG. 7, crosses predetermined voltage level $V_1$, a time $t_0$ is recorded and predetermined voltage level $V_2$ is set. Then, as v(t) crosses level $V_2$, time $t_1$ is recorded and voltage level $V_3$ is set. As v(t) then crosses voltage level $V_3$, time $t_2$ is recorded. Voltage level $V_3$ is maintained until v(t) re-crosses that level, at which point time $t_3$ is recorded and voltage level $V_2$ is set. Similarly, as v(t) crosses voltage level $V_2$, time $t_4$ is recorded and voltage level $V_1$ is set. Finally, as voltage v(t) crosses level $V_1$, time $t_5$ is recorded. This process continues for every half cycle of line voltage and during each the times $t_i$, $t_i'$, $t_i''$, etc. are recorded. For the three-level scheme of FIG. 7, six values of time are recorded for each half cycle. Generalizing, the multipoint signal acquisition scheme yields twice the number of time values for each half cycle as there are predetermined voltage levels.

The next step in the multipoint signal acquisition scheme of the present invention is to calculate line difference values, delta-$t_i$, from the previously acquired time values as follows:

$$\text{delta-}t_0 = t_1 - t_0$$
$$\text{delta-}t_1 = t_2 - t_1$$
$$\text{delta-}t_2 = t_3 - t_2$$
$$\text{delta-}t_3 = t_4 - t_3$$
$$\text{delta-}t_4 = t_5 - t_4$$
$$\text{delta-}t_0' = t_1' - t_0'$$
$$\text{delta-}t_1' = t_2' - t_1'$$
$$\text{delta-}t_2' = t_3' - t_2'$$
$$\text{delta-}t_3' = t_4' - t_3'$$
$$\text{delta-}t_4' = t_5' - t_4'$$
etc.

From the above it can be seen that the multipoint signal acquisition scheme of the present invention yields "2N - 1" time differences for "N" predetermined voltage level settings on each half cycle of the instantaneous line voltage. Note that for noise-free, signal-free, unperturbed line voltages, the delta-$t_i$ values from one half cycle to the next are identical, that is:

$$\text{delta-}t_0 = \text{delta-}t_0' = \text{delta-}t_0'' = \ldots$$
$$\text{delta-}t_1 = \text{delta-}t_1' = \text{delta-}t_1'' = \ldots$$
$$\text{delta-}t_2 = \text{delta-}t_2' = \text{delta-}t_2'' = \ldots$$
$$\text{delta-}t_3 = \text{delta-}t_3' = \text{delta-}t_3'' = \ldots$$
$$\text{delta-}t_4 = \text{delta-}t_4' = \text{delta-}t_4'' = \ldots$$

Figure 8:
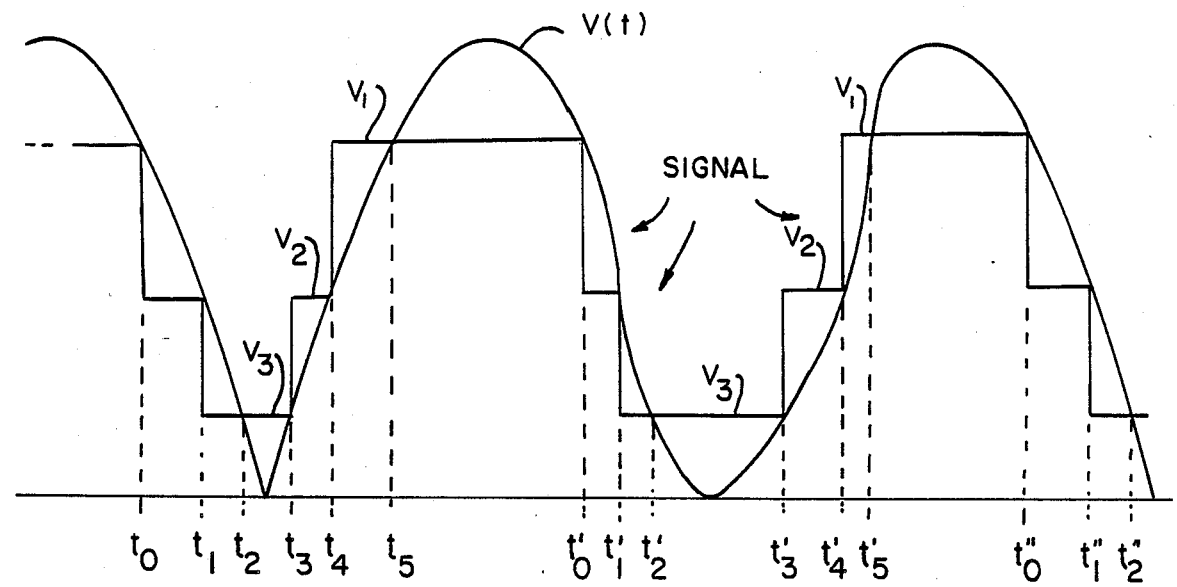
FIG. 8 is a diagram similar to FIG. 7 in which the voltage waveform is modulated.

If, on the other hand, the rectified instantaneous line voltage is perturbed by an outbound signal (as shown in FIG. 8), the corresponding delta-$t_i$ values are, in general, not equal. A preliminary test for detection of a signal then could involve taking the difference between successive delta-t values, i.e., $$s_i = \text{delta-}t_i' - \text{delta-}t_i.$$

For a three-level detection scheme, the result is $$s_0 = \text{delta-}t_0' - \text{delta-}t_0$$
$$s_1 = \text{delta-}t_1' - \text{delta-}t_1$$
$$s_2 = \text{delta-}t_2' - \text{delta-}t_2$$
$$s_3 = \text{delta-}t_3' - \text{delta-}t_3$$

Changing notation, by replacing the superscripts to a subscript "j", where "j" is the half cycle count index, these equations generalize as follows:

$$\text{delta-}t_{ij} = t_{i+1,j} - t_{ij}$$
$$s_{ij} = \text{delta-}t_{i,j+1} - \text{delta-}t_{ij},$$

where i=0, 1, ... (2N−2), and j=0, 1, 2, ...

It sometimes occurs, however, that the outbound signal from the central site may ring into the following half cycle voltage. As a result, it is preferred that the above detection equation for $s_{ij}$ be modified to compare time differences between alternate half cycles instead of adjacent half cycles. With this modification, $$s_{ij} = \text{delta-}t_{i,j+2} - \text{delta-}t_{ij},$$

Signal acquisition unit 11 includes five subparts, namely an analog signal input and DC level producing circuit, a comparator with hysteresis circuit, an edge control with digital signal input circuit, a resistor divider switching circuit with digital input, and a counter and count latching circuit with digital outputs.

Figure 9:
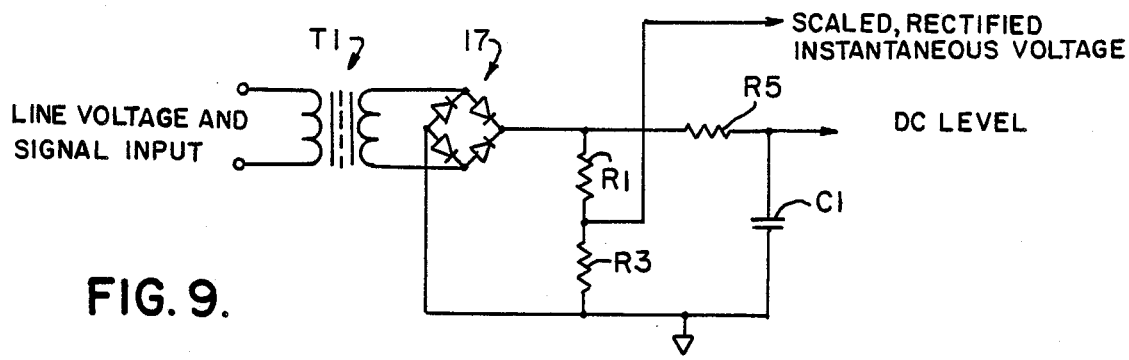
FIG. 9 is an electrical schematic of a portion of the acquisition unit shown in FIG. 6.

The analog signal input and DC level producing circuit of acquisition unit 11 is illustrated in FIG. 9. This circuit includes an instrument transformer T1 connected across one phase of the electric distribution network line so that the line voltage and the signal (if any) are applied thereto. The instrument transformer isolates the circuit of FIG. 9 and also scales the input voltage down from a value such as 120 Volts to more suitable levels such as ten (10) volts.

The output of transformer T1 is supplied to a bridge rectifier 17 whose output is supplied to a resistor-capacitor (RC) network made up of a 2.32K resistor R1, a 7.68K resistor R3, a 510K resistor R5, and a 0.22 micro-F capacitor C1. Resistors R1 and R3 are connected in series across the output of bridge rectifier 17, with the junction between those resistors providing a scaled, rectified instantaneous voltage output of the circuit of FIG. 9.

Resistor R5 is connected in series with capacitor C1 across the bridge rectifier output. The junction between that resistor and the capacitor provides a DC level voltage for the remainder of the acquisition unit circuitry. This DC level is used to produce the predetermined voltage levels used in acquiring the time differences discussed above. Moreover, as the input voltage magnitude varies, the DC level output of the circuit of FIG. 9 varies accordingly, as do the predetermined voltage levels derived therefrom. This makes the acquisition unit circuitry relatively insensitive to changes in the absolute magnitude of the carrier wave voltage.

Figure 10:
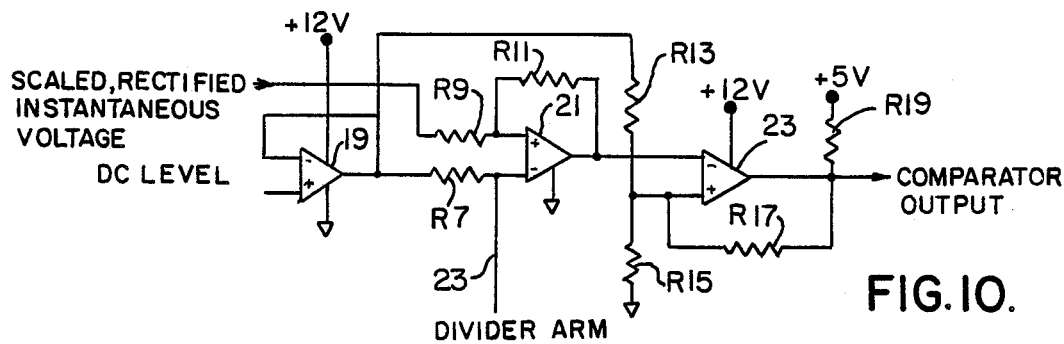
FIG. 10 is an electrical schematic of a second portion of the acquisition unit shown in FIG. 6.

Turning to FIG. 10, the comparator with hysteresis circuit portion of the acquisition unit 11 includes a first operational amplifier 19 (such as one-quarter of a 2902-type operational amplifier chip) configured as a buffer with its output connected to its inverting input. The non-inverting input of op amp 19 is connected to the DC level input from the circuitry of FIG. 9.

The output of comparator 19 is connected through a 76.8K resistor R7 to the inverting input of a comparator 21 (such as one-quarter of a 2901-type voltage comparator chip). The voltage appearing on the inverting input of comparator 21 is determined by the DC level from the circuitry of FIG. 9 and the resistance presented by a divider arm 23 discussed below in connection with FIG. 12. Resistor R7 is in series with this divider arm resistance, so that the voltage on the inverting input of comparator 21 is a direct function of the divider arm resistance. The divider arm resistance is used to set the predetermined voltage values which are used in determining the time differences discussed above.

The scaled and rectified instantaneous voltage from the circuitry of FIG. 9 is supplied through a 51K resistor R9 to the non-inverting input of comparator 21. The output of that comparator is, therefore, a function of whether the instantaneous voltage has reached the predetermined voltage value set on the inverting input of the comparator. Once the predetermined voltage set by the divider arm on the inverting input of the comparator is reached, the output of comparator 21 changes (the change can be from Low to High or from High to Low depending whether the instantaneous voltage rose to reach the predetermined voltage or fell to reach it). Hysteresis is provided by means of a 510K resistor R11 connected between the output of comparator 21 and its non-inverting input.

The output of comparator 21 is supplied to the inverting input of a second comparator 23 (again one-quarter of a 2901-type comparator chip). The non-inverting input of comparator 23 is connected to the junction between a 20K resistor R13 and a 470K resistor R15. Resistors R13 and R15 are connected between the DC level output of buffer 19 and ground.

A 470K feedback resistor R17 is connected between the output of comparator 23 and its non-inverting input. The output of this comparator is also connected by means of a 10K resistor R19 to a +5 V power source.

Comparator 23 inverts the output of comparator 21 and level shifts the output to a digital +5 V level. This output is the output of the circuit of FIG. 10 and is a signal required by time count latching circuitry (discussed below) to latch the times at which the instantaneous voltage v(t) crosses one of the predetermined voltage values.

The output of comparator 23 is supplied to the edge control circuit (FIG. 11) of acquisition unit 11. This edge control circuit includes an exclusive-OR gate G3 having one input connected by means of the interface to the computer 15 so that the computer can control the operation of gate G3. The other input to gate G3 is the output of comparator 23. Gate G3 acts as an inverter, controlled by the computer, to activate a rising-edge triggered latch (FIG. 13) when the information from comparator 23 is falling-edge information.

Figure 12:
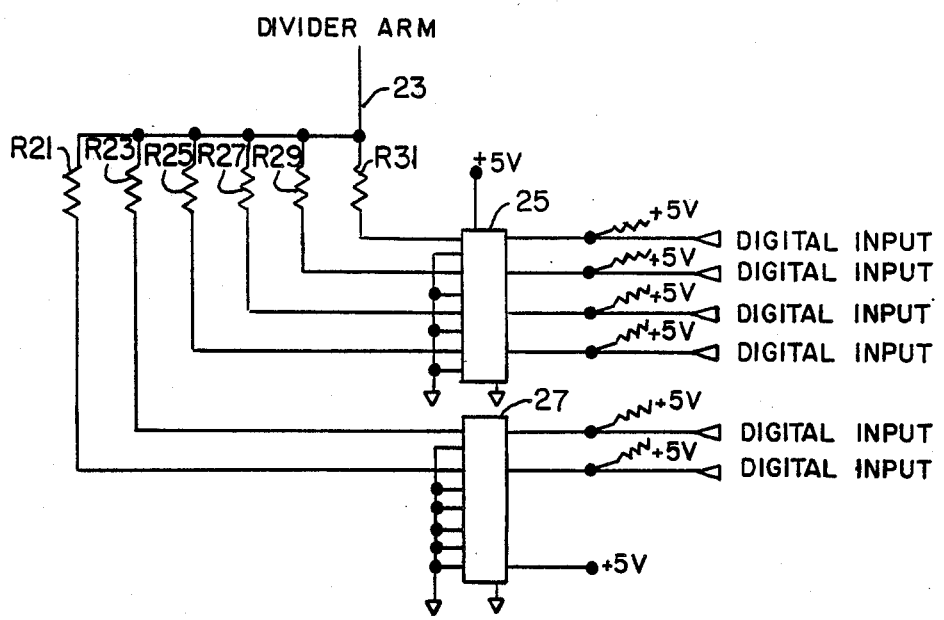
FIG. 12 is an electrical schematic of a fourth portion of the acquisition unit shown in FIG. 6.

Divider arm 23, discussed above in connection with FIG. 10, is shown in FIG. 12. The divider arm is directly connected to a plurality of resistors R21, R23, R25, R27, R29, and R31. Resistor R21 is a 931K resistor, the resistance of resistor R23 is 402K, the resistance of resistor R25 is 232K, the resistance of resistor R27 is 143K, the resistance of resistor R29 is 95.3K, and the resistance of resistor R31 is 22.6K. The other side of each of these resistors is connected to a corresponding terminal of one of a pair of 4016-type digital switches 25 and 27. These digital switches are in turn controlled by computer 15. More specifically, each resistor can be connected through its digital switch to ground by means of the digital control inputs to the digital switches. By suitably controlling the digital control inputs of the digital switches, computer 15 can add any combination of the resistors R21 to R31 to the resistance appearing on divider arm 23. This allows the computer to thereby vary the predetermined voltage references appearing on the inverting input of comparator 21 (FIG. 10) to implement the detection scheme described above.

Figure 11:
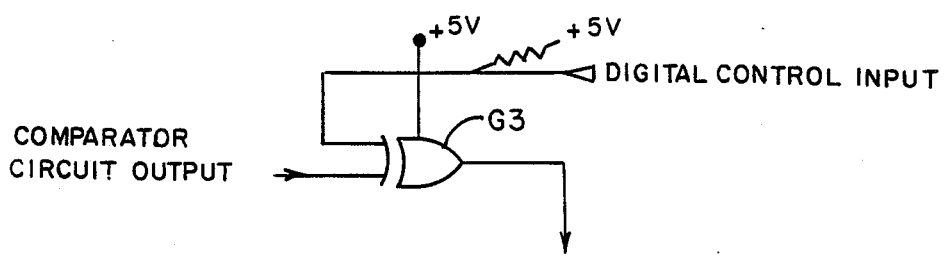
FIG. 11 is an electrical schematic of a third portion of the acquisition unit shown in FIG. 6.
Figure 13:
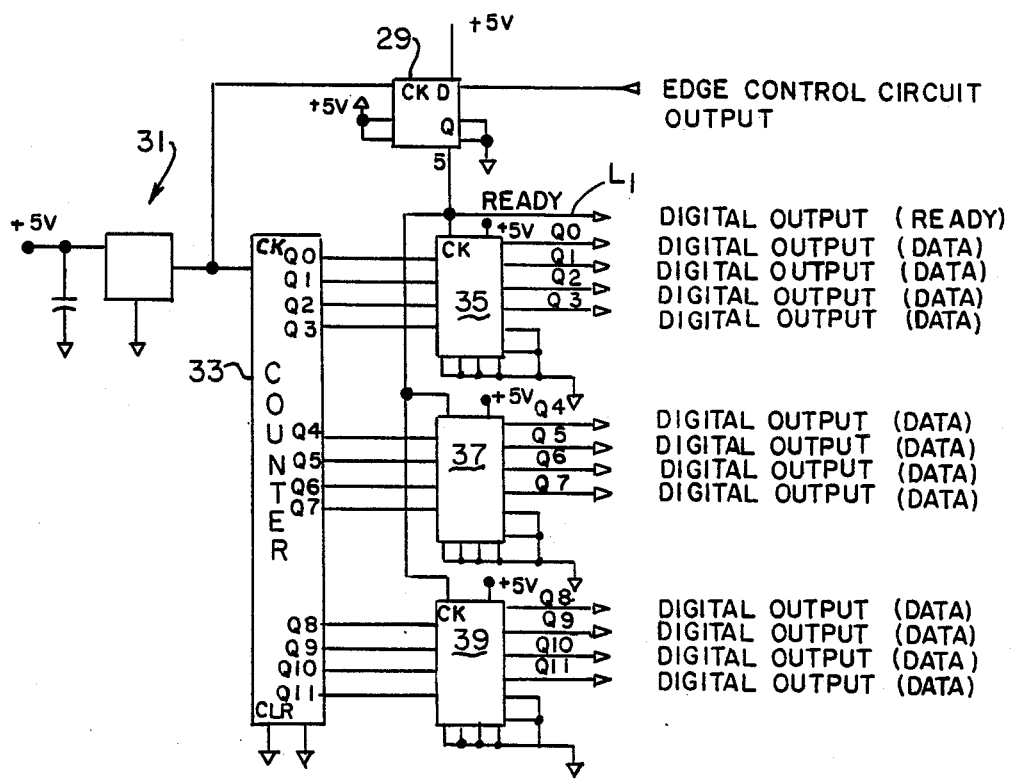
FIG. 13 is an electrical schematic of a fifth portion of the acquisition unit shown in FIG. 6.

The count and count latching circuit portion of acquisition unit 11 is illustrated in FIG. 13. This circuit includes a D-type latch 29 whose D-input is connected to the edge control output of exclusive-OR gate G3 (FIG. 11). The clock input of latch 29 is connected to a 2 MHz crystal oscillator 31 which functions to synchronize the operation of the circuitry of FIG. 13.

The clock output of the oscillator is also supplied to the clock input of a 4040-type twelve-stage counter 33.

The counter counts the oscillator output continuously, each count being equal to a time of 0.5 microsecond. The counter output is supplied over the twelve output pins Q0 through Q11 to a set of three flip-floss 35, 37, and 39. The clock input of each of the flip-flops is connected to the Q-output of latch 29. When a rising edge pulse is received from gate G3, the count of counter 33 is latched into the flip-flops.

The Q-output of latch 29 is also supplied over a line L1 to computer 15 to inform the computer that the latched time values are ready to be read. The outputs of the flip-flops are also connected over a plurality of digital output lines to the computer (via the interface) so that the latched time values are made available to the computer. The outputs of flip-flops 35 and 37 supply the least significant byte of the time data to the computer and the output of flip-flop 39 supplies the remaining lower order nibble of the higher order byte.

The interface between the signal acquisition unit and computer 15 varies depending upon the particular computer used. The present invention has been implemented using an IBM PC personal computer, although it is certainly not intended that computers used in the field necessarily be that large or expensive. The interface utilized with this particular computer was a 24-bit parallel digital I/O interface sold under the trade designation PI012 by Metrabyte. This interface plugs directly into the PC bus. The twenty-four digital I/O lines are implemented via a 8255-5 type programmable peripheral interface chip. This particular chip has three eight-bit ports, PA, PB, and PC which are programmable. The present invention uses the PB port as input to the acquisition hardware for setting the predetermined voltage levels, and uses ports PA and PC as outputs for transferring latched time values back to the computer. Of course, this is a matter of design choice which will vary with the particular interface used.

It should be appreciated that computer 15 and, therefore, acquisition unit 11 are under software control. The computer issues signals to the acquisition unit setting the predetermined voltage levels against line voltage and the acquisition unit returns latched time values to the computer memory for later processing. Level settings and time data transfer must occur in real time. Therefore, computer processing speed and software efficiency are very important. With a program compiled using the Lattice C programming language, speed on the IBM PC computer was sufficient for an eight-point acquisition scheme. The same program used on a Compaq 286 computer was fast enough to handle a twelve-point acquisition scheme. A copy of the source code for the Lattice C program is appended hereto as Appendix A.

Figure 14:
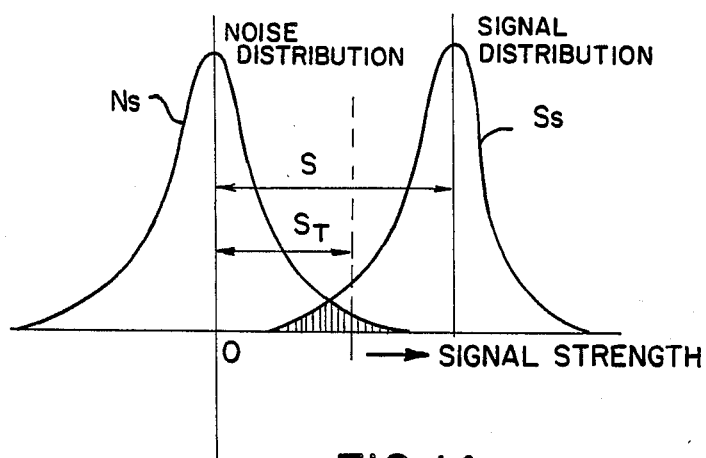
FIG. 14 is a diagram illustrating the possible distributions of noise strengths and signal strengths for a typical communications system.

Conventionally, the merit of a communication system is measured by gathering noise statistics without signal and comparing those statistics with measured signal strength statistics. If the noise is white, then the standard assumption is that the distribution function of the noise statistics is Gaussian with zero average. Such a distribution is illustrated in FIG. 14 by the label "Ns". The signal strength distribution curve, labelled "Ss" in FIG. 14, is assumed to have the same shape as the noise distribution curve but shifted by an amount S. The area of overlap between the two curves (shown crosshatched in FIG. 14) is a measure of the "goodness" of the system. The narrower the distribution curve and the larger the distance S is, the smaller the crosshatched area and the better the communication. The distance S is simply the generated signal strength without noise at the point of measurement. To improve the merit of the communications system, error detection, error correction and redundant coding techniques are typically used. The need for such measures is dictated by the limitation on the quantity S and the area of overlap between the two distribution curves.

In a situation with relatively constant conditions, a fixed threshold $S_T$, is conventionally established as a lower bound below which a measured strength is simply rejected.

Unfortunately, in an electric power distribution network the conditions do not always remain even relatively constant. With changes in load or the like, the conditions of the power distribution network can change significantly. If, under these changed conditions, the noise distribution curve remains the same, too many legitimate signals will be rejected.

As a result the present invention uses a modified recursive filter to dynamically adjust the threshold of detection $S_T$ based upon the signal strength S and average noise levels. This, of course, is done without requiring too much memory or processing.

Consider a set of noise strengths $A_1, A_2, \ldots A_j$. The average noise strength is then:

$$A_{vj} = (A_1 + A_2 + A_3 + \ldots + A_j)/j$$

It can be shown that the average noise strength, $A_{v(j+1)}$, for $j + 1$ samples is related to the average $A_{vj}$ for $j$ samples as follows:

$$A_{v(j+1)} = A_{vj} * (j/(j+1)) + A_{j+1}/(j+1)$$

Setting $n = j+1$, and regrouping, we get the recursive equation $$A_{vn} = ((n-1)A_{v(n-1)} + A_n))/n.$$

That is, the present noise strength average is a relatively simple function of the preceding noise strength average and the present noise strength sample.

It should be appreciated that this function approaches a constant value asymptotically as the number of noise strength samples increases. Conversely, for a small number of samples, the average can change rapidly.

A strength sample which contains signal will, of course, be much larger than the noise strength average for large n if the signal-to-noise ratio is relatively large. As a result, an average $A_v$ which includes both signal and noise samples will be larger than the long-term average $A_{ns}$ of noise only samples. The amount by which $A_v$ is larger than $A_{ns}$ depends upon the signal-to-noise ratio K and the ratio, nu, of the number of signal samples to the number of noise samples being averaged.

It turns out that $A_v$, although larger than the average noise, preferably should not be used as the detection threshold since some appreciable number of noise samples do have an energy greater than the mixed average $A_v$. This is particularly true if the content of signal samples per batch is around 10% or less.

Rather, it is preferred that not all samples be incorporated into the average. For this purpose both the signal strength average and the signal energy average are computed. If the signal strength for a sample is less than half the signal strength average, that sample is not incorporated into the signal strength average or the energy average. Omission of such signals biases both averages upwardly. Similarly, if the sample has an energy (computed as described above) less than seventy-five per cent (75%) of the signal energy average, that sample is not incorporated into either average. This procedure has the effect not only of biasing the averages upwardly but also reducing the number of data points used for averaging and increasing the ratio, nu, of signal data points to noise data points.

In addition, the energy of samples taken in segment II of the cycle (see FIGS. 3-5) is also compared with the energy average. If the sample does not exceed seventy-five per cent (75%) of the energy average, the sample is again rejected and not included in any of the averages. This is because for a legitimate signal the energy in segment II is a large proportion of the total signal energy.

This detection scheme has been used on data from heretofore troublesome locations for detection of outbound information and has been found to work much better than previously used detection schemes. In practice, the scheme operates as follows: As soon as the apparatus of FIG. 6 is connected for operation, the apparatus sees the first noise sample and assumes it to be signal and so adds it to both averages. Subsequently more noise data is processed and either rejected or accepted. With each sample the system improves its threshold. Once there is some signaling activity, the thresholds are immediately biased by the signal. From that point on, practically only signals will pass through the filtering process. Note that the apparatus thus has to go through a learning process before it is ready.

Once the filter (the computer as programmed above) is ready (i.e., once it is recursively set by the samples), the decoding process begins by looking for bit patterns that are allowed under the communications protocol being used. It should be appreciated that the initialization of the filter can readily be accomplished by means of signals already present on the waveform such as time synchronization signals periodically sent out from the central site (such as a substation).

It is important that the number of samples in the averages not grow too large, since then the apparatus is not adequately responsive to dynamic changes in the electric power distribution network. This is preferably accomplished by resetting the number of samples to "1" when a certain predetermined number of samples is reached. For example, when the number of samples reaches twenty-five (25), the sample index number is reset to "1" and the average at the end of the twenty-fifth sample is assumed to be the first data point for the next twenty-five samples.

Crosstalk rejection with the system of the present invention has been discussed above. For crosstalk which starts in the third segment of the cycle (segment III of FIGS. 3-5), crosstalk is rejected if the sample energy in the third segment exceeds the sample energy in the second segment by a predetermined ratio, such as fifty (50). In that event the sample is not accepted as a signal or for any of the averages.

The harder situation is that of FIG. 5 where the crosstalk starts in segment I. To eliminate these samples from biasing the averages, first one determines a long-term average $E1_{av.n}$ of the sample energy in segment I. For a large number of samples this average will be close to the average for noise only, even if there is occasionally some crosstalk. If the sample energy, E1, for segment I is greater than some multiple of the noise average $E1_{av.n}$ for that segment then crosstalk is present and the sample must be rejected. It is preferred that the multiple be a relatively large number such as fifty (50) since this implies a difference in signal strength of only seven or so.

A program written in the BASIC programming language which incorporates the detection schemes discussed above is appended hereto as Appendix B.

Figure 15:
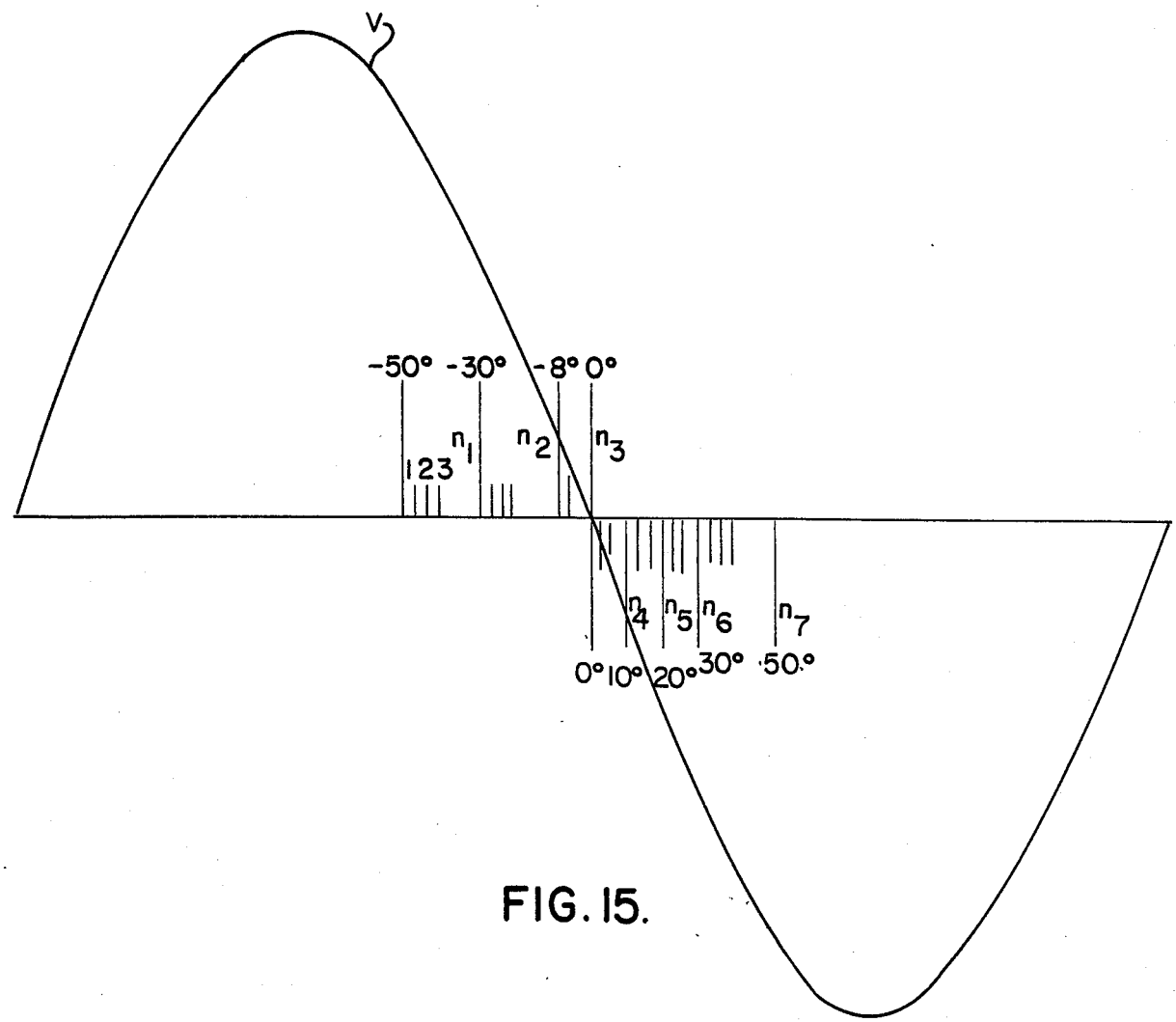
FIG. 15 is a diagram illustrating the sampling of each cycle of the voltage waveform by the present invention.

Detection of outbound information by the present invention is best summarized in connection with FIG. 15 which illustrates the sampling done in one cycle of the voltage waveform. For each such cycle, there are a predetermined number $n_7$ of sample points taken between the $-50°$ and $+50°$ points on the waveform. The first $n_1$ of these samples are taken in segment I, the segment of the waveform where no sample should be present. Samples $n_1+1$ to $n_3$ are taken in segment II, where signal can be expected. Samples $n_3+1$ to $n_7$ are taken in segment III where signal can also be expected.

For every two zero crossings, as described above, the following time differences are obtained:

delta-$t_1$, delta-$t_2$, ... delta-$t_{n1}$, delta-$t_{n1+1}$, ... delta-$t_{n7}$ This is a continuing process as sampling is done every half cycle.

Next, if delta-$t_{n2}$ is greater than zero, find the maximum value of delta-t (called delta-t(max)) between $n_1$ and $n_5$ and the minimum value of delta-t (called delta-t(min)) between $n_4$ and $n_7$. From delta-t(max) and delta-t(min) compute the difference diff=delta-t(max)−delta-t(min).

This will be a positive result.

On the other hand, if delta-$t_{n2}$ is less than zero, find delta-t(min) between $n_1$ and $n_5$ and delta-t(max) between $n_4$ and $n_7$ and compute diff=delta-t(min)−delta-t(max), which result is negative.

After computing the difference diff, the energy for the various segments is computed. For example, the energy E1 in segment I is computed by summing the squares of all delta-$t_j$ for $j=1$ to $j=n_1$, since $n_1$ marks the boundary between segment I and segment II. The energy E2 in segment II is similarly computed by summing the squares of delta-$t_j$ for $j=n_1+1$ to $j=n_3$. The energy E3 in segment III is computed by summing the squares of delta-$t_j$ for $j=n_3+1$ to $j=n_7$. And the total energy in segments II and III is obtained by adding E2 and E3.

These sums and differences are computed for each cycle, so the first set is labelled $diff_1$, $E1_1$, $E2_1$, $E3_1$, and $E4_1$. Similarly, the second set is labelled $diff_2$, $E1_2$, $E2_2$, $E3_2$, and $E4_2$ and so on for each subsequent set of data.

To prevent lock-out due to crosstalk, $E3_1$ is compared to $E2_1$ and if the ratio $E3_1/E2_1$ is greater than fifty, the first set of data is pitched since it is contaminated by crosstalk. Otherwise, the first set of data is stored using the absolute value of $diff_1$.

The second set of data is obtained in the same manner as the first and the ratio $E3_2/E2_2$ is examined. If the ratio exceeds fifty, the data is pitched. Otherwise it is retained.

Once two sets of data pass the E3/E2 test, the first being labelled set 1 and the second being labelled set 2, then the ratio $E1_2/E1_1$ is computed. If this ratio is larger than fifty, the second set is pitched and the first set is retained, since the second set has crosstalk in segment I. New sets must be obtained and checked until a second set passes the $E1_2/E1_1$ greater than fifty test.

Once a second set passes the $E1_2/E1_1$ greater than fifty test, then for those two sets the $E1_2/E1_1$ ratio is examined to see if it is less than 0.02. If so, this indicates that the first set is contaminated by crosstalk in segment I, while the second set is not. Set 1 is discarded in this case and replaced by set 2.

These steps insure that set 1 is not contaminated by crosstalk and that segment I of that cycle has noise data only.

The values of $diff_1$, $E1_1$, $E2_1$, $E3_1$, and $E4_1$ now become the average values $diff_{av}$, $E1_{av}$, $E2_{av}$, $E3_{av}$, and $E4_{av}$ against which later sets of data are compared. Now the signal detection or extraction methods are applied to the second set of data, if one remains. If the absolute value of diff for this set of data is less than half the absolute value of $diff_{av}$, then the new set of data is rejected and the averages are not updated. Similarly, if the new value of E4, the total energy in segments II and III is not greater than seventy-five per cent of $E4_{av}$, the set of data is rejected and the averages are not updated. Finally, if the new value of E2, the energy in segment II is not greater than seventy-five per cent of $E2_{av}$, the set of data is rejected and the averages are not updated.

On the other hand, if the data passes all these tests, then the averages for diff, E1, E2, E3, and E4 are updated and the diff data is accepted as a signal.

The next step is to obtain the next set of data. This data is initially tested for crosstalk and is accepted for further processing only if E1 is not greater than fifty times $E1_{av}$ and E3 is not greater than fifty times E2. Data sets which pass this test are then tested for signal presence as described above. Once a set is found to contain signal, it is included in the various averages. Otherwise it is not.

This process continues until the number of accepted sets reaches a predetermined number such as twenty-five (25), at which point the number of sets is reset to "1" and the current averages are used as the values for the first set of data. Resetting in this manner, as described above, permits the present system to respond to dynamic changes in the electric distribution network and limits the number of data points which need be handled.

In view of the above, it will be seen that the various objects and features of the present invention are achieved and other advantageous results are attained. It will be appreciated that the constructions and methods disclosed herein are illustrative only and are not to be interpreted in a limiting sense.

Having thus described the invention, what is claimed and desired to be secured by Letters Patent is:

1. Apparatus for detecting outbound signals carried by cyclic waveforms over an electric power distribution network comprising:
   means for rectifying cyclic waveforms transmitted from a central site over an electric power distribution network to create a rectified cyclic waveform of successive half cycles;
   means for sampling the rectified waveform to obtain sample waveform values, said sampling occurring in three segments of each cycle of said waveform, a first segment being a region of the cycle in which valid signals are always absent, a second segment being a region of the cycle in which valid signals appear, and a third segment distinct from the second segment being a region in which valid signals appear; and means for detecting the presence of outbound signal information as a function of the sample waveform values in the three segments.

2. The apparatus as set forth in claim 1 wherein the sample waveform values represent the energy in the waveform in the three segments, the sample values being rejected as containing other than valid signal information when the energy values in the first segment exceed a threshold value.

3. The apparatus as set forth in claim 2 wherein the detecting means includes means for setting the first segment threshold value from sample values for the first segments of previous cycles of the cyclic waveform.

4. The apparatus as set forth in claim 1 wherein the sample waveform values represent the energy in the waveform in the three segments, the sample values being rejected when the energy values in one of the second or third segments exceed the energy values in the other of the second or third segments by a factor of approximately fifty.

5. The apparatus as set forth in claim 1 wherein the sample waveform values are time differences representing the difference between the times the voltage of an unmodulated voltage waveform would have reached predetermined points and the times the voltage of the sampled waveform actually reached said predetermined points.

6. The apparatus as set forth in claim 5 wherein the squares of said time differences are representative of the energy in said sampled waveform.

7. The apparatus as set forth in claim 5 further including means for deriving a DC voltage value from the rectified waveform, the magnitude of the DC voltage value representing the average magnitude of the cyclic waveform and varying with variations in the average magnitude of the cyclic waveform.

8. The apparatus as set forth in claim 7 further including means responsive to the DC voltage value to modify the predetermined points as a function of the DC voltage value to compensate for changes in the average magnitude of the cyclic waveform.

9. The apparatus as set forth in claim 5 wherein the rectified waveform instantaneous voltage is compared with one predetermined point at a time, further including means for changing the predetermined point with which the instantaneous voltage is compared once the instantaneous voltage reaches the previous predetermined point.

10. The apparatus as set forth in claim 9 including means for generating a stop signal when the instantaneous voltage reaches a predetermined point, further including counter means responsive to said signal for continuously counting and for latching the time upon receipt of the stop signal.

11. The apparatus as set forth in claim 10 wherein the predetermined point changing means is responsive to the stop signal to change the predetermined point with which the instantaneous voltage is compared.

12. Apparatus for detecting outbound signals carried by cyclic waveforms over an electric power distribution network comprising:

means for rectifying cyclic waveforms transmitted from a central site over an electric power distribution network to create a rectified cyclic waveform of successive half cycles;

means for sampling the rectified waveform to obtain sample waveform values, said sampling occuring in three segments of each cycle of each waveform, a first segment being a region of the cycle in which valid signals are always absent, a second segment being a region of the cycle in which valid signals appear, and a third segment distinct from the second segment being a region in which valid signals appear; and means for comparing sample waveform values from alternate half cycles of the rectified waveform to detect differences indicative of outbound signal information in the three segments.

13. A method of detecting outbound information carried by cyclic waveforms over an electric power distribution network comprising the steps of:

sampling a cyclic waveform originating at a central site and transmitted over an electric power distribution network to obtain a plurality of samples for each cycle of the waveform, at least some of said samples having a first expected value in the absence of an outbound signal and having a second expected value in the presence of an outbound signal on the waveform;

setting a signal detection threshold from a predetermined number, N, of samples taken; and modifying the signal detection threshold if the value of the (N+1)st sample exceeds a predetermined fraction of the previously set signal detection threshold.

14. The method as set forth in claim 13 wherein the samples are time differences, further including the steps of deriving energy samples from the time differences, partitioning the energy samples into three groups representative of three different segments of a cycle of the cyclic waveform, the first group representing a first segment of the cycle in which valid signals are absent, setting a threshold for energy in said first segment from energy samples taken from the first segments of preceding cycles, and rejecting the samples for that cycle if the energy samples in the first group exceed the threshold for the first segment.

15. The method as set forth in claim 14 wherein the threshold of the first segment is obtained by averaging the total energy samples for the first segment and omitting from that average samples from any cycle in which the total energy in the first segment samples greatly exceeds the average.

16. The method as set forth in claim 13 wherein the samples are time differences and the threshold is a function of the time differences of previously sampled cycles.

17. The method as set forth in claim 13 wherein the predetermined fraction is approximately one-half.

18. The method as set forth in claim 13 wherein the signal detection threshold is an average of samples taken from previous cycles, each of said samples being included in the average only if they exceeded the predetermined fraction of the threshold which existed at the time said sample was taken.

19. The method as set forth in claim 18 wherein the average of previous accepted samples is reset after a predetermined number of samples are included to allow response to dynamic network changes.

20. A method of rejecting crosstalk in outbound information flow along a multi-phase electric distribution network comprising:

for at least one phase of a multi-phase electric distribution network, dividing a cyclic waveform associated with that phase into at least three segments per cycle, a first of said three segments being selected such that outbound information is absent from the first segment unless crosstalk has occurred, a second of said segments being selected such that outbound information appears in said second segment, and a third of said segments being selected such that outbound information also appears in said third segment;

comparing the energy in each segment with an energy threshold for that segment; and rejecting a cycle under test for the presence of signal when the energy in the first segment exceeds the threshold for said first segment.

21. The method as set forth in claim 20 further including the step of rejecting a cycle under test for the presence of signal when the energy in the third segment greatly exceeds the energy in the second segment.

22. The method as set forth in claim 21 wherein the cycle under test is rejected if the energy in the third segment exceeds the energy in the second segment by a factor of at least fifty.

23. A method of detecting outbound information in a multi-phase electric distribution network comprising:

deriving a waveform from the voltage on at least one phase of a multi-phase electric distribution network, which derived waveform includes at least a cyclic carrier component;

partitioning cycles of the waveform into at least three segments per cycle, a first of said segments being before a valid signal would appear on the waveform, a second of said segments being in the area where a valid signal could appear but before a zero crossing of the waveform, and a third of said segments being in an area where a valid signal could appear but after a zero crossing of the waveform;

comparing the energy in at least the first segment with an energy threshold for that segment; and identifying the presence of a signal in the cycle under test only if the energy in the first segment falls below the threshold for that segment and the energy in the second and third segments is indicative of the presence of a signal in that cycle.

24. The method as set forth in claim 23 wherein the indicating step results in the indication of signal presence only if the energy in the second segment and the energy in the third segment together exceed a threshold for those segments together.

25. The method as set forth in claim 23 wherein the energy comparing step includes measuring differences between the times when the unmodulated waveform would reach predetermined voltages and the times the actual waveform reaches said predetermined voltages, said energy being a function of the sum of the squares of said time differences.

26. The method as set forth in claim 23 further including the step of determining the signal strength in the second and third segments and comparing said signal strength with a signal strength threshold, said signal strength threshold being a function of signal strengths in the second and third segments for previous cycles.

27. The method as set forth in claim 26 wherein the signal strength threshold is modified by each successive cycle signal strength if the signal strength for said successive cycle exceeds a predetermined fraction of the pre-existing signal strength threshold.

28. The method as set forth in claim 26 in which the threshold determining function is an average of signal strengths in the second and third segments for previous cycles.

29. The method as set forth in claim 28 wherein said average omits signal strengths which fall below a predetermined fraction of the signal strength threshold existing at the time the signal strength under consideration was taken.

30. The method as set forth in claim 26 wherein the signal strength is determined by sampling the waveform during the second and third segments and selecting extreme values for each segment for determination of signal strength.

* * * * *